United States Patent
Lennartsson

[11] Patent Number: 5,446,846
[45] Date of Patent: Aug. 29, 1995

[54] DISTRIBUTED COMPUTER SYSTEM ARRANGEMENT

[76] Inventor: Kent Lennartsson, Östergårdsgatan 1:20, S-212 22 Malmö, Sweden

[21] Appl. No.: 969,302
[22] PCT Filed: Aug. 13, 1991
[86] PCT No.: PCT/SE91/00539
 § 371 Date: Feb. 17, 1993
 § 102(e) Date: Feb. 17, 1993
[87] PCT Pub. No.: WO92/03881
 PCT Pub. Date: Mar. 5, 1992

[30] Foreign Application Priority Data
Aug. 20, 1990 [SE] Sweden ............... 9002703

[51] Int. Cl.⁶ .................................. G06F 13/00
[52] U.S. Cl. .................... 395/250; 364/DIG. 1; 364/238.2; 364/238.5; 364/240
[58] Field of Search ............................ 395/325, 275

[56] References Cited

U.S. PATENT DOCUMENTS

| | | | |
|---|---|---|---|
| 4,028,682 | 6/1977 | Weber et al. | 395/325 |
| 4,034,346 | 7/1977 | Hostein | 395/325 |
| 4,155,117 | 5/1979 | Mitchell, Jr. et al. | 395/325 |
| 4,373,183 | 2/1983 | Means et al. | 395/325 |
| 4,481,580 | 11/1984 | Martin et al. | 395/325 |
| 4,641,266 | 2/1987 | Walsh | 395/325 |
| 4,660,141 | 4/1987 | Ceccon et al. | 395/325 |
| 4,683,530 | 7/1987 | Quatse | 395/275 |
| 4,730,251 | 3/1988 | Aakve et al. | 395/325 |
| 4,755,934 | 7/1988 | Inoue | 395/275 |
| 4,841,450 | 6/1989 | Fredriksson | 364/468 |
| 4,868,783 | 9/1989 | Anderson et al. | 395/325 |
| 4,896,256 | 1/1990 | Roberts | 395/325 |
| 4,999,805 | 3/1991 | Culley et al. | 395/325 |
| 5,037,310 | 8/1991 | Marinello | 439/61 |
| 5,038,320 | 8/1991 | Heath et al. | 395/275 |
| 5,253,346 | 10/1993 | Okabayashi et al. | 325/325 |

FOREIGN PATENT DOCUMENTS

| | | |
|---|---|---|
| 8808653 | 11/1988 | WIPO . |
| 8902141 | 3/1989 | WIPO . |
| 8903145 | 4/1989 | WIPO . |

Primary Examiner—Jack B. Harvey
Assistant Examiner—Ayaz R. Sheikh
Attorney, Agent, or Firm—Pollock, Vande Sande & Priddy

[57] ABSTRACT

A distributed computer system of interconnected module units which perform logical operations at different locations. A serial data bus interconnects all of the module units through a connecting device which enables the module to communicate over the serial bus. The connecting device includes a memory device having stored therein identification information to identify the module unit to other module units communicating over the bus. A logic circuit which is connected to the memory device transfers the information from the memory to the module unit during an initialization phase of the system. The module units are thereafter able to communicate over the serial data bus. The connecting device has first and second sets of connectors for mating with corresponding connectors on the serial bus and module units. Thus, each module need not know where it is being connected along the serial bus, as all information for communicating over the bus is provided by the connecting device.

10 Claims, 4 Drawing Sheets

DISTRIBUTED COMPUTER SYSTEM ARRANGEMENT

The present invention relates to a distributed computer system arrangement with master units and slave units which communicate with one another via a serial bus connection and in which the slave units can be connected to the connection via connecting devices and on their respective connection can be assigned identifications in the system.

Systems with parallel-connected multiprocessors which operate in real time are already known. As an example of such a system, the TRAINET system can be mentioned, which is offered on the open market by KVASER, Kinna, Sweden. Another system is constituted by the CAN system which operates with prioritised messages. Through the former system, it is already known to arrange module units which can be connected to the bus connection(s) in question. For establishing the identification of each connected module unit, use has thus far been made of mechanical switches (DIP switches) or binary codes which have been arranged in or at the connecting devices. By adjustment of said switches or introduction of said binary codes, a higher-level unit (master unit) in the system can assign the connected module a number in the loop connection in question.

There is, however, a requirement that the system can be given a structure which makes possible a categorisation from the point of view of the designer. Systems of this type are relatively complex and there is a marked requirement to separate, for example, the work of the system builder from the work of the module manufacturer. Intimate cooperation has thus far been necessary between said two categories, which has, for example, meant that the module manufacturer has had to have great knowledge of the communication system as such. The system builder has in turn been compelled to go into detailed designs which can be related to the structure of the module units. There is thus a requirement to arrange an interface/a barrier between the communication functions and the module functions.

SUMMARY OF THE INVENTION

The aim of the present invention is inter alia to solve this problem.

It is possible to carry out the arrangement of an interface or a barrier so that the computer system is capable of accomplishing its tasks and functioning without interference from the barrier. It is thus possible, for example, for the higher-level unit (the master) to reconfigure the whole system with the aid of software changes. It is also possible, for example, to carry out the numbering and/or renumbering of the modules in a simple manner by means of digital communication with the invention. As far as connecting functions in systems of this type are concerned, it is a generally known fact that the costs for such connectors are high. It is therefore of important to bring down the number of connecting conductors in the connecting device which the invention also provides. It is of interest as far as the builder of the module units is concerned to be able to make long production runs with a few model versions. The module manufacturer is able to build his modules starting from performance information from the system builder. The system builder is in turn able to build the system without assistance from the module manufacturer because the invention solves this problem.

The system builder is, for example, to be able to decide whether he wants an electrically isolated contact in the connecting device or not without assistance from the module manufacturer. He can choose between optical and/or electrical transfer media. The latter will in turn need not consider the question of whether or not there is to be an electrical contact in the connecting device.

What can be considered to be characteristic of the new arrangement is that the identification of the module units in the system can be effected by means of memory members and/or microprocessor members which are arranged in each control device or associated each control device. As an alternative or complement to a microprocessor, an advanced logic circuit can be used. In one embodiment information in, the memory member and/or microprocessor member can be read out or accessed from either the connected module unit or the bus connection, or both the module unit and the bus connection. In the case where a microprocessor member is in one or more of said connecting devices, the master in the system can communicate with the processors of the connecting devices during predetermined communication stages which are intended for this. Alternatively, the master may communicate during communication stages in which the bus connection/connections are not occupied by other, ordinary communication. As an example the connector processors can be arranged to transmit so-called emergency stop messages to a unit in the computer system via the bus connection. Connecting devices can be of different designs, with or without electrical connection between connecting device elements in connecting devices. In one embodiment, each connecting device has relatively few connecting members/conductor connections. In one embodiment, use is made of two bus connections in the system, the first bus connection of which is used for basic information in the system and the second bus connection for giving commands and for reporting messages (trigger signals and/or sync signals). One and the same connecting device can have connections or connection conductors to two different bus connections, to two pairs of connection conductors from a bus connection, power supply, emergency stop function and identification. In one embodiment, use is made of relatively few connecting members/conductor connections, for example 9.

The invention also takes into consideration system-specific structural parts as emerges from the following patent claims.

The advantages of the invention become apparent. A natural barrier can be arranged in each connecting device between the system builder and the module manufacturer. Standard connectors with an interface can be produced in long production runs which brings down the costs of connecting devices. Connecting devices can be made with a few connecting conductors, which simplifies the connecting device structure and thus makes the same less expensive. A connecting device can be made in different versions, for example with or without electrical isolation. It is to be noted in this connection that the electrical barrier constitutes a costly part for the module unit as such, while it is only a small part for the system part. With increasing frequencies, electrical isolation becomes more expensive. By means of the invention, different designer categories can operate in parallel without mutual influence. The only thing that the module builder needs to know is what performance the module unit is capable of carrying out and this can be indicated by the system designer at an early stage. By means of the invention, it becomes possible to implement more sophisticated solutions for the bus connection as such than has previously been possible. The module builder can work with minimised knowledge of the system. In a case with a microprocessor in the connecting device, a special time/time interval can be assigned for the communications between the higher-level unit of the system and the connecting device processors. The connecting device processors can moreover transmit emergency stop signals, which increases the possibilities for the system as such. It is possible to construct simple interfaces and the CAN structure can likewise be preserved intact. Mechanical switches and binary code arrangements can be eliminated in connecting devices. A memory member can be used in connecting devices which can contain further information, for example information on how the bus connection looks, different variables/parameters which apply to the bus connection, the current degree of interference sensitivity, the length of the bus connection and so forth.

LIST OF FIGURES

An embodiment of an arrangement which shows the characteristics which are significant for the invention is described below with simultaneous reference to the attached drawings, in which.

An arrangement implementing the invention can be based on a hardware connection with a 9-pin DSUB connector. Via this connector, signals are transmitted for a CAN bus, a synchronisation bus, an emergency stop bus, a serial input of address and bus data, as well as power supply to external electronics. The signals can be held at TTL level and a power supply is effected with +5 Volts. The signals are transmitted to a T-coupler which can contain electrical isolation of different types as well as drive electronics for driving signals on the communication line. How the communication line is constructed depends upon which requirements are made of the communication line in terms of electrical isolation, voltage levels, type of line, transmission lengths and transmission rate. Although this part can have a different structure in different systems, an exemplary embodiment according to the following is proposed. In the computer system (the CAN system), communication circuits of the type INTEL 82526 and 82C200 (Philips) can be used. Other components can nevertheless be used in this connection. It is also possible to group different functions in separate loops with CAN communication, retaining the possibility of synchronising the entire system with another CAN communication. The system builder can use a solution with regard to competition which gives a price/performance solution which is best for him without losing the possibility of standardised connection of modules to the system. According to the invention, the physical stock is released from the different modules at the same time as simple structural possibilities for the communication line are brought about in a simple manner. The parts which are important for the physical stock like optocouplers and drive electronics can consequently be placed outside the electronics in the node/the module unit. In order to do this, a T-coupler/connecting device is introduced, which links the node and the communication line. In such a manner, two standardised barriers can be obtained, one for the interface between the node and the T-coupler and one for the interface between the T-coupler and the communication line. It is also possible to handle fast signals for synchronisation. The fast signals can be assigned to a separate bus connection. This also makes it possible to have separate bus connections for different types of equipment and at the same time that the machine in question can be synchronised by means of this common synchronisation communication. In order that the connected node know its place in the CAN communication, there should be information about its place in the system. In order to obtain full or good flexibility, there should also be information on how the transmission of bits is to take place. According to the invention, it can be specified how this information is transferred to the node on connection to the communication line/bus connection. According to FIGS. 1–4, a 9-pin DSUB connector with sockets is to be included for connection to the T-coupler/connecting device. In this connecting device, the pins have the following function:

| Pin | Function |
| --- | --- |
| 1 | +5 Volts for driving electronics in the T-coupler, min +150 mA. |
| 2 | GND for +5 Volts, on pin 1. |
| 3 | CANout, transmission on the CAN bus, high when recessive. |
| 4 | CANin, reception from the CAN bus, high when recessive. |
| 5 | SYNCout, transmission on the CAN bus for synchronisation, high when recessive. |
| 6 | SYNCin, reception from the CAN bus for synchronisation, high when recessive. |
| 7 | EMERGENCYout, a signal for driving the emergency stop line, low on emergency stop. |
| 8 | CODEdata, serial data, with address and mode setting, for specification on interpreting data see section 4.2. |
| 9 | EMERGENCYin, a signal which reflects the level on the emergency stop bus, low on emergency stop. On reset of the module, this is used for clocking in data on the line CODEdata. |

Signals are to follow the TTL standard on signal levels except on pins 8 and 9 which have the following data.

| | |
| --- | --- |
| 8 | Vlow < 1.35 Volts, Vhigh > 3.85 Volts. |
| 9 | Vlow < 1.35 Volts, Vhigh > 3.85 Volts. |

The information in question is entered into a memory circuit of the type X24C01 from XICOR or equivalent. As a proposal, the following information can be included in said memory circuit/memory member.

| Byte no. | Content |
| --- | --- |
| 1 | Node number, CAN. |
| 2 | Data corresponding to bus timing register 0 at an oscillator frequency of 16 MHz, CAN. |
| 3 | Data corresponding to bus timing register 1, CAN. |
| 4 | Data corresponding to output control register bits 2-7, CAN. |
| 11 | Node number, SYNC. |
| 12 | Data corresponding to bus timing register 0 at an oscillator frequency of 16 MHz, SYNC. |
| 13 | Data corresponding to bus timing register 1, SYNC. |
| 14 | Data corresponding to output control register bits 2-7, SYNC. |

As far as the connection to the CAN node is concerned, there is to be included in the T-coupler a 9-pin DSUB connector with pins for connection to the node. On this connecting device, the pins have the following function:

| 1 | Connection to master. |
| --- | --- |

For connection to the bus connection, the same connector type has been chosen as for connection to the node since this is the smallest connector type according to the DSUB standard. The connecting device is to consist of a 9-pin DSUB device with pins. 9 connection points are thus obtained, which can be distributed in the following manner.

| Pin | Function |
| --- | --- |
| 1 | +Supply 10 to 20 Volts above −Supply. |
| 2 | −Supply return conductor for +Supply. |
| 3 | CAN+, high when recessive bit is transmitted. |
| 4 | CAN−, complementary signal to CAN+. |
| 5 | SYNC+, high when recessive bit is transmitted. |
| 6 | SYNC−, complementary signal to SYNC+. |
| 7 | −Supply return line for +Supply, same as pin 2. |
| 8 | +Supply 10 to 20 Volts above −Supply, = pin 1. |
| 9 | RESET, normally high, low if fault occurs. |

Connecting up is carried out so that a flat cable, for example of the type UL-20130 with twisted pairs and screened, on connecting up has its twisted-pair conductors correctly on the paired signals.

| 2 | Connection to next node. |
| --- | --- |

For connection to the bus connection, the same connector type has been chosen as for connection to the device as this is the smallest connector type according to the DSUB standard. This connector is to consist of a 9-pin DSUB connector with sockets. This gives 9 connection points which can be distributed in the following manner.

| Pin | Function |
| --- | --- |
| 1 | +Supply 10 to 20 Volts above −Supply. |
| 2 | −Supply return conductor for +Supply. |
| 3 | CAN+, high when recessive bit is transmitted. |
| 4 | CAN−, complementary signal to CAN+. |
| 5 | SYNC+, high when recessive bit is transmitted. |
| 6 | SYNC−; complementary signal to SYNC+. |
| 7 | −Supply return conductor for +Supply, same as pin 2. |
| 8 | +Supply 10 to 20 Volts above −Supply, = pin 1. |
| 9 | RESET, normally high, low if fault occurs. |

Connecting up is carried out in a corresponding manner to the above example.

| 3 | Alternative method of connection. |
| --- | --- |

In this case, use is made of DSUB connectors on both sides of the T-coupler, with extension cords between the T-couplers. This makes it simple to install and take away nodes. For connection of the communication line, a number of alternatives can apply.

1. Connection with 9-pin DSUB female at one end and 9-pin socket device at the other. This allows rapid connecting in of new modules, but also becomes more expensive also.
2. Same as above, but where one of the connector types is equipped with a cord for direct connection to the next module. The problem is that the cord will always be too long or too short.
3. That there is only one 9-pin connection and that there are connected to the external connector two conductors so that the communication line continues.
4. That there are no external connectors but that soldering in takes place directly in the T-box.
5. Same as above but where the internal connection takes place with a connecting device, for example Multikomponent no. 17 F84, mini-PCB together with the line indicated above.

For a distributed control system, synchronisation is an important characteristic. In this connection, use can be made of time synchronisation or event synchronisation. Although time synchronisation gives the best possibilities for integration in the communication hardware, it is often better in cyclical machines such as textile machines/weaving machines to use the event synchronisation method. In this connection, there are a number of different possibilities. The starting point for event synchronisation in a cyclical machine is constituted by the angle of the machine shaft. All events are linked to the position of this shaft. In the event of selection of CAN as serial protocol for the communication in or within the machine, a built-in possibility is afforded for transmitting trigger signals. The selection also opens up possibilities for using CAN for synchronisation of different activating members by assigning them serial absolute messages which contain the main shaft position with great accuracy in both time and angle. Another advantage in using CAN for synchronisation is that use can be made of only one protocol for the complete machine.

Figure 5:
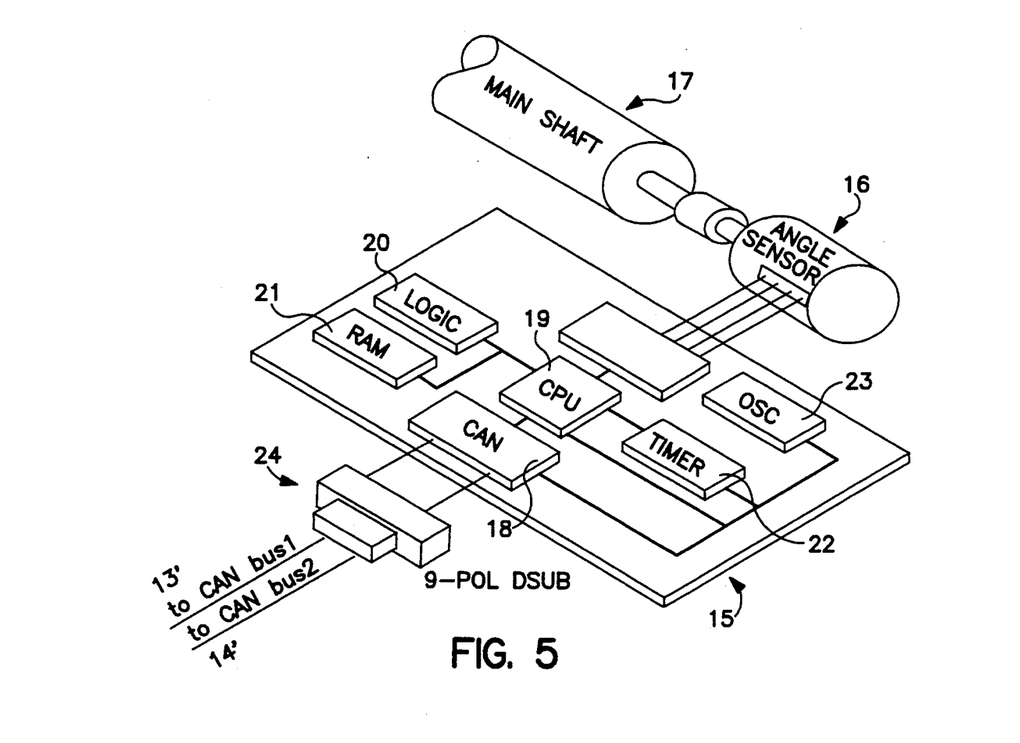
FIG. 5 shows in perspective the connection of a module unit to machinery and to a connecting device for connection to the bus connection.

Connecting up can take place according to FIG. 5, in which the main shaft is assigned a CAN angle-sensing unit. This unit has an angle transmitter with reference, a microprocessor and a CAN unit. Since there is a microprocessor $\mu P$ in the arrangement, it can potentially give angle data, speed and acceleration. The angle transmitter can be of different types. As an example, a resolver or a decoder can be mentioned. With a decoder, it is possible to reach a definition of 1 million pulses/revolution at a pulse rate of 500 kHz. For a weaving machine, the maximum speed can be estimated at 25 revolutions/- sec which corresponds to 10°/ms. The fastest electromechanical arrangement can be estimated to have a time constant of 1 ms and a spread of 100 µs. This gives an accuracy of approximately 1° with 10 kHz. The angle-sensing unit affords advantages for other units in the system in that these can be provided with information on angles, speed and acceleration. The angle-sensing unit can sense whether the weaving machine is carrying out backward or forward rotation. As long as the machine is in operation in the power mode, the master unit is always between the operator and the remaining machine system, which means that the master unit has the possibility of informing the slave units of the direction before it orders them to begin working. The angle-sensing unit thus does not need to give information on the direction in the rotary movement.

The angle-sensing unit can be assigned its own message and when this message is transmitted all the modules which are connected to the bus connection are adjusted to receive the message. In this manner, there is received in each module unit the latest available information on the position of the machine shaft and this has taken place in the same space of time. Data can consist of only the position or of any combination of position, speed and acceleration. Another possibility exists in that trigger signals can be transmitted instead of actual data. In a start-up phase, the master or the slave units request that the angle-sensing unit transmit a specific code when the shaft reaches a specific angle. For example, "when the shaft reaches the angle 89.6°, transmit number 5 in first byte and speed in deg/s in second byte". When the slave unit detects the message and picks up "5" in the first byte, it knows that the shaft has reached 89.6° and it also receives the actual speed in the second byte. If there is another number in the first byte, it knows that the message is not intended for it and that it can disregard the message. This method makes the transmission shorter and increases the accuracy.

Figure 1:
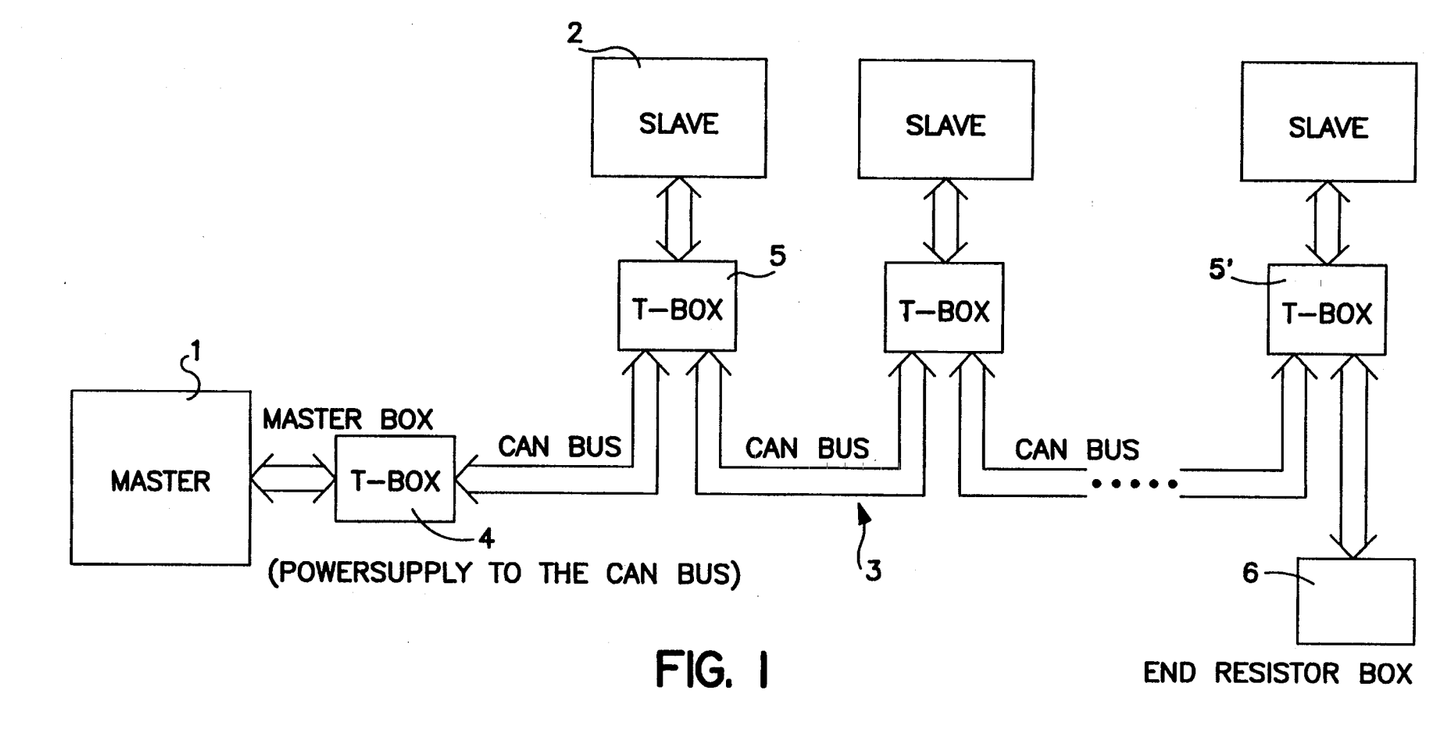
FIG. 1 shows in block diagram form a computer system with master units and slave units connected via a bus connection and connecting devices (T-boxes)

In a case in which each message in itself constitutes data, a simple variation is that each degree of the machine shaft corresponds to a given message, for example the message 1 is transmitted when the figure 1° is reached, 2 when 2° is reached and so forth. The advantage in this case is that the method can be made very fast. If ICAN is used in each slave unit, ICAN can be arranged to receive a given message, for example 89. When the message 89 is transmitted by the CAN angle transmitter unit, the ICAN module at or on the slave unit can generate an interruption for the microprocessor µP. The microprocessor in question thus knows without reading the message that the required position has been reached and can act directly in accordance with this information. A transmission can be achieved every 100 µs if each degree is transmitted in a high-speed machine. If no data is transmitted and the bus connection is free, it takes 43 µs to transmit a message at 1 MHz bit rate. If the message also includes 1 byte for speed and 1 byte for acceleration, the transmission takes a total of 59 µs. This means that system parts other than the CAN angle transmitter unit can only be permitted to transmit on the bus connection if their message has a lower priority than the message of the CAN angle transmitter unit and that no more than two bytes of data can be used either by the CAN angle transmitter unit or the slave units. There is no requirement to transmit trigger signals on every degree of the revolution. The master unit or the slave units can request their trigger signals. This fact frees the bus connection to a great extent, but it can be difficult to use the free space. If each unit on the bus connection is expected to receive a trigger signal on a rotation of 1°, certain restrictions can be introduced. Alternatively, use can be made of a continuous flow of data on the bus connection. Messages can thus have speeds of 43 µs if they do not contain any data and the bit rate is 1 MHz. As a further alternative, only selected data can be transmitted. If only the necessary data is transmitted on the bus connection, optimum use can be made of this. In this case, approximately 1000 angle values per revolution can be transmitted for even the fastest weaving machines. If messages with 8 bytes of data and lower priority are to be permitted, it is still possible to transmit at least approximately 265 angle values within one revolution. Further advantages can be obtained in the latter case if the angle transmitter unit takes over the bus connection before it sends it message. This can be done in the following manner. Messages 1–361 are reserved for the angle transmitter unit. Message 0 is reserved for the master unit. Messages 1–360 correspond to the respective degrees of the revolution of said machine shaft and message 361 is used as bus connection seizure. Other messages on the bus connection do not need to have any restrictions. 129 µs before the angle transmitter unit is to transmit the actual message, it gives a continuous order to the CAN unit to transmit message 361. As it orders that the CAN unit is to transmit the actual message, the CAN unit can perhaps wait up to 43 µs before the bus connection becomes free. After a maximum of 86 µs, the message has been transmitted to other CAN units. The maximum bus connection occupancy for a sequence is in this case 215 µs. The bus connection seizure can be executed in hardware. The system can also be arranged so that collisions do not occur.

A further alternative method is to arrange the CAN angle transmitter unit to transmit the value of the angle as soon as it is detected. In the event that use is made of a separate synchronisation bus connection in which only the angle transmitter unit is permitted to transmit, the time delay can in this case be made constant and become dependent on only the master unit. All units on the synchronisation bus connection will receive the message at the same time within an individual bus connection bit. Since the master unit knows the time delay, all trigger messages can be predetermined. Alternatively, the slave units can be informed of the delay time in a start-up phase so that they can handle the time delay themselves. In a further exemplary embodiment, extrapolated data can be transmitted. Increased accuracy can be achieved in this case if the angle transmitter unit extrapolates the values to the time when the other units receive the message. The least expensive method of distributing data within a machine is, however, to use only one bus connection, on which all types of information are transmitted. In this case, each message needs to have the correct priority on each occasion, which makes great demands on the system designer. The system as such becomes simpler to handle if messages which are transmitted in the system are separated into a general group and a command and reporting group. In the general group, all messages which are not time-critical are collected, and in the order and reporting group, all time-critical messages are collected. An example of time-critical messages can be "machine shaft assumes the value 0°, release yarn, yarn break, yarn has come out, initiate main nozzle and so forth". For all messages of this type, it is necessary to know the maximum time delay and the maximum time spread. The master unit needs the time which elapses between the yarn release and the yarn arrival. This can be solved according to the following. The information is transmitted on the order and reporting bus connection. The master unit transmits the message "release yarn" and starts a counter. When the microprocessor of the feed wheel unit receives the message, the magnet is acted upon. When the arrival detector unit recognises the arriving member, the unit transmits the message "yarn detected". The master unit stops the counter as soon as the message arrives and calculates the elapsed time. The master unit transmits the message "coming time and release yarn at 72°. The nominal speed is 7200°/s and nominal arrival time is 240° to the arrival detector unit and the feed wheel unit on the general bus connection". The master unit transmits further to the CAN angle sensor unit "the nominal speed is 7200°/s. Transmit 72° and 240° together with the actual speed deviation". The feed wheel unit assumes an internal time delay of 5.3 ms from reception of the trigger signal to actual yarn release. The trigger signal should in this connection arrive 38.16° in advance. The feed wheel unit transmits "transmit 33° to the angle transmitter unit. When the message 33° is received by the feed wheel unit, two counters start. After 0.12 ms, the magnet is acted upon. When the yarn leaves the peg or the pin, counter 1 stops and when the message 72° arrives, counter 2 stops. The feed wheel unit now knows how well it has implemented the request of the master unit and also has information which is needed to carry out more accurate work next time. In this case, it is assumed that the yarn release occurred at 72.5°. The feed wheel unit transmits the message "yarn release occurs at +0.5°" to the master unit. When the arrival detector unit receives the message 240° or detects the yarn, a counter starts and stops upon a corresponding event. When the message 240° also includes speed deviation from nominal speed, the arrival detector can calculate the actual arrival angle, that is to say 245.7°. The message "the arrival was carried out at +5.7°" is transmitted to the master unit. The master unit can in this connection calculate the requested time very accurately.

The invention can thus include a parallel multiprocessor system operating in real time. The system is defined by the system designer by means of a set of basic rules. Each module unit can carry out a function assigned to it. The units are connected by means of 1, 2 or more bus connections for transmission of messages. Message transmission is carried out very rapidly between the different units and operates according to strict rules and a little handling organisation. Each module unit receives from the outset given basic data from the system designer. Each unit can handle the message transmission in a message reception member. The messages can consist of "envelopes" and "letters". There are in this connection 2032 envelopes in total which are numbered from 0–2031. A letter can be blank or have up to 8 lines. The message handling units can be made in different ways. Only "official" envelopes are handled by the message system. Each unit in each module checks every message against an existing checklist in order to check that every message is correct. Each message can be thought of as being transmitted by means of a "courier". The message transmission covers every message handling unit which is connected to the bus connection. The possible speed of the courier is dependent on the length of the connection. There can be higher speed with a short connection than with a long connection. The speed is defined by the system builder. The transmission time for the message is dependent on the number of the envelope and the length of the letter. Messages with a low number always have priority as long as the courier has not started to transmit a message to another message handling unit. In this case, transmission of a preceding message is always implemented. The courier carries out frequent message transmission and on every transmission only one message is conveyed and acknowledgement of reception of this message is received. Each message handling unit can receive a copy of each message from the courier. Only the message handling unit can hand over messages to the courier. A higher-level unit in each module unit can instruct the message handling unit in the module unit regarding the messages which are to be transmitted and which are to be received. A special service is in this case that the higher-level unit in each unit can order the message handling unit to transmit an empty envelope to other message handling units. The receiving message handling unit will directly add a corresponding letter in the envelope and hand it over to the courier for further transport.

Every time the courier arrives, the message handling unit is directly to check the number of the envelope for the message and compare it against its list "messages which are to be received". If the comparison agrees, the message is to be checked whether it is correct. Moreover, an acknowledgement of reception is to be delivered to the courier. If the message is not correct, the information "message not accepted" is to be delivered to the courier. When the message has been received in a correct manner by any module, the higher-level unit in the unit is to be informed. Subsequently, on the occasion of transmission, the higher-level unit orders the message unit to take the letter in the letterbox concerned and put it in an "envelope". The latter is specified in the list and the message is sorted among outgoing messages in number order, the lowest number being placed highest up. Messages are transmitted from the top of outgoing messages to the courier. If a message is taken by the courier and this does not provide acknowledgement of reception thereof within the set time, the message is to be delivered to the courier one more time. If the message unit has attempted delivery 96 times without success, the higher-level unit is to be advised that the message transmission is not functioning. In a case in which an empty envelope arrives with the information "messages are to be completed", the corresponding letter is to be directly delivered to the courier.

When the module unit is activated, the higher-level unit in each module unit is directly to deliver the existing list of "messages which are to be transmitted", "messages which are to be received" and "messages which are to be completed". It is also to carry out the orders of the system designer regarding how the message handling unit is to be organised, that is to say how many letterboxes there are to be and where these are located. Moreover, letters are to be taken out and placed in letterboxes according to basic orders.

The system makes use of one master unit which is responsible for order in the system. The envelope number 0 is the envelope of the master unit. All slave units are always to be arranged to receive letters from the master unit in envelope number 0. The master unit assigns envelopes which are to be used by the slave units for different types of letter. It informs the higher-level units of the slave units of this in message number 0. No slave unit can transmit any message before the master unit has given permission. The master unit can redistribute envelopes at any time. In such a manner, a very flexible master and slave system is obtained. The slave units can always be reached by meassage number 0 from the very start. Use can be made of this message to assign envelopes to letters for each slave unit during a start-up phase. This can be carried out in the following manner. Every slave unit has a unique number from 1–32 as address. All letters which a slave unit is to use are numbered. The maximum number of letters is 256. The module unit builder has carried out this function from the outset so that the builder of the master unit knows which information each letter contains. The letters of the master unit can contain types of master unit letter, slave unit address, local letter number, envelope which is to be used for above letter, local letter number, and envelope for said letter.

By means of another master unit letter, one envelope can be exchanged for another if so required. The transmitting slave unit and the receiving slave units receive the message at the same time. In practice, this means that the system manufacturer of a CAN network can use standard modules and still have full control over how the information is exchanged between the modules. In order to be able to operate satisfactorily, every module requires given information in a given time via the network and this is provided by the designed system from the outset. The type of information a module is to be able to produce for the network is also introduced into the system. How the information is to be distributed over the net is, however, a matter for the system designer and he now has the possibility of defining this in the program for the master unit.

FIG. 1 shows the principle for the system in question, which comprises a master unit 1 and the slave unit 2. The units 1, 2 are connected to a connection 3 which in principle forms a loop, preferably a loop with few wires. The loop is connected in a master box 4 and T-boxes 5 which are shown in detail in FIGS. 2 and 3. Also included in the system is a resistance matching unit 6.

Figure 2:
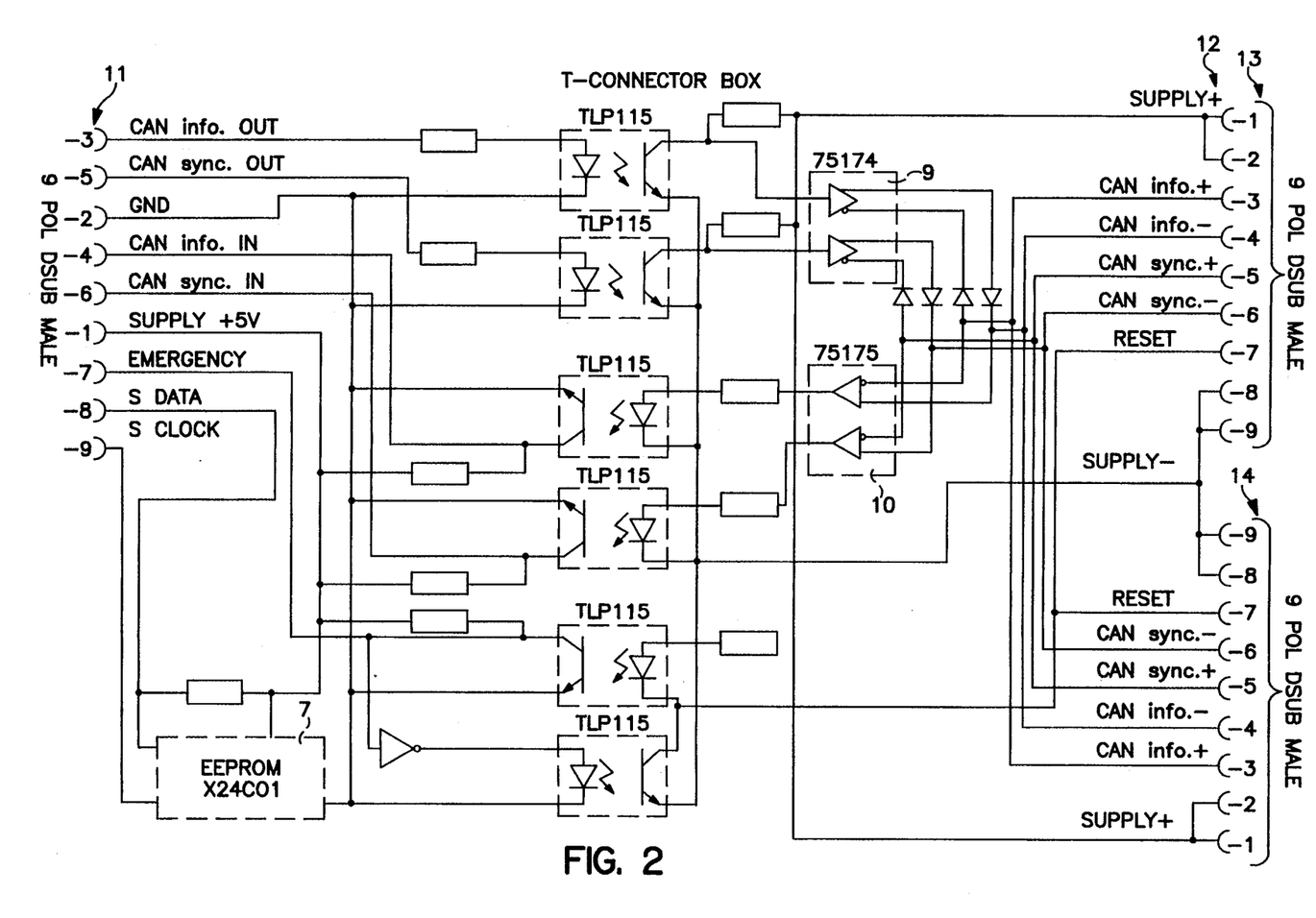
FIG. 2 shows in diagrammatic form a wiring diagram for a connecting device to a module unit.
Figure 3:
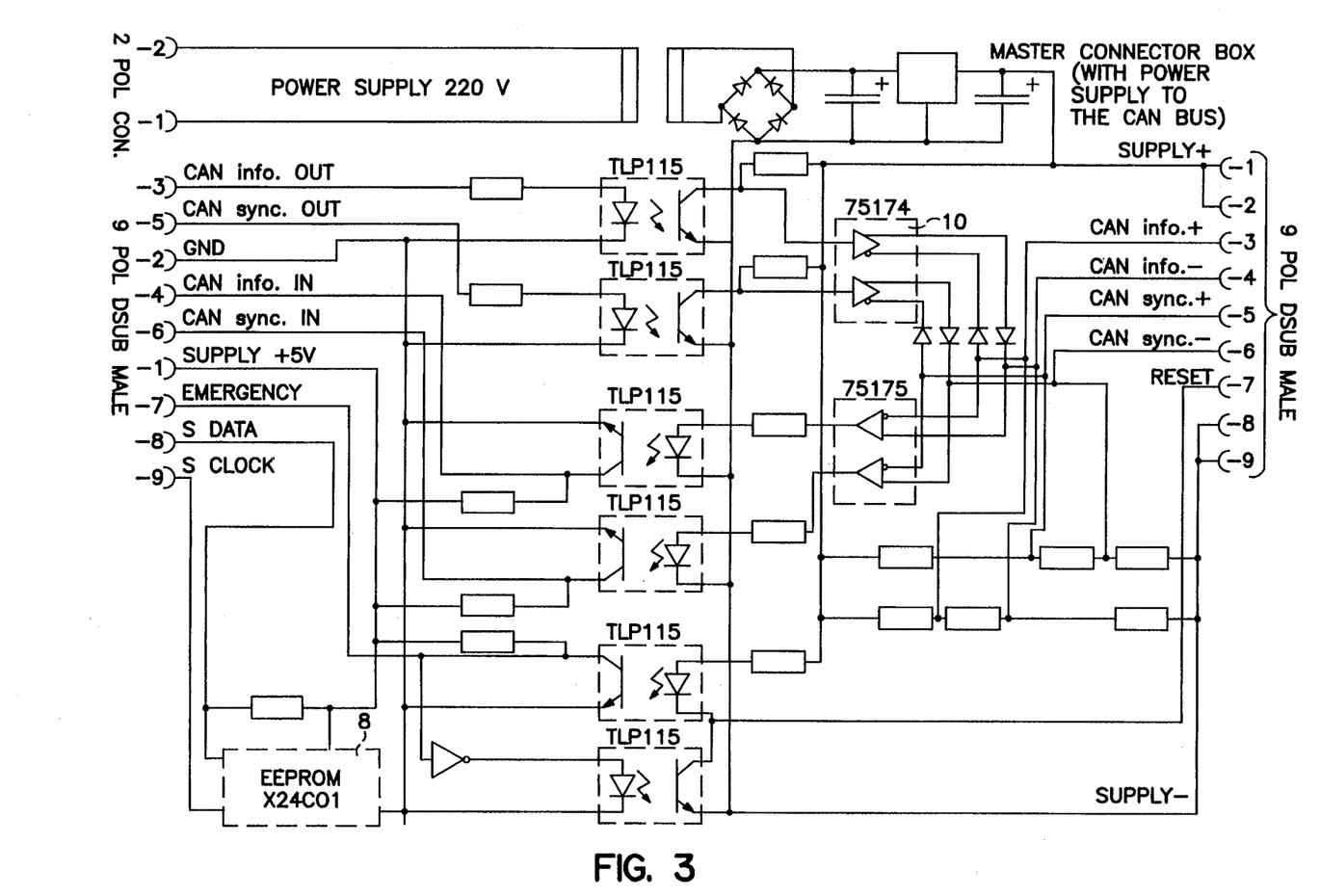
FIG. 3 shows a connecting device for connection of the master unit, which connecting device includes a power supply for the bus connection.

In FIGS. 2 and 3, there is included a memory member unit 7 and 8, respectively, of the type mentioned above. Also included is an amplification member 9 and 10 respectively (75174, 75157). Each T-box has a connection for two pairs of bus connection parts, which emerges clearly from the figure. Electrical isolation is also arranged in the connecting device. The connecting device can also be of the type in which there is electrical contact between incoming and outgoing pins 11 and 12 (FIG. 2), respectively. Each memory unit 7, 8 receives input data and clock pulses at its input and can be read out from the master/slave unit or the bus connection. The pins 11 are connected to the slave unit and the pins 12 to the bus connection(s). Two bus connections BUS1, BUS2 have been indicated in FIG. 2 by 13 and 14.

In FIG. 5, the bus connections have the reference numbers 13', 14'. A module/slave unit has been indicated by 15. The unit 15 reads an angle sensor 16 which is connected to a main shaft 17 in a textile machine known per se. The module unit is constructed in a manner known per se and comprises one or more CAN controllers 18 (one for every bus), a microprocessor 19, logic circuits 20, memory circuits 21 and time circuits 22, 23. The connecting device 24 comprises according to the above its own memory unit and/or its own microprocessor. The connecting device can consist of units which are separated from the module units and the communication system in other respects and which are manufactured separately and are available as standard.

The system can work with an initiation phase, a start-up phase and an operating phase. In the initiation phase, each module ingestion has a relationship established to or in the system in association with connection of the module to the system. With connected modules, the start-up phase and the operating phase can then be used in association with the handling which is to take place by means of the system. With the aid of the information content which is present in an actual memory in each flexible lead connector, each module 2 can during said initiation phase ensure that signals which are sent to the T-box are transmitted and received between the modules and the T-box is designed and adapted for the main connection (bus 3) in the system. The module can consequently learn which number it has in the system, which is important since the master unit transmits messages blind to the modules during the start-up and operating phases. In association with the design of the system, the system designer can store in each flexible lead connector the place of the module in the system, which place indication is thus found in the T-box. The T-boxes thus know the number which the module connected to each T-box is to be assigned. The slave unit thus does not need to be made with information which relates to its place in the system. The initiation phase thus envisages a stage in which functioning communication is established between units concerned. The system designer thus defines the communication procedure in the system and this procedure can be indicated to the module units during the design phase. A large part of this information can be provided after the system has been taken into use, which expediently takes place in a start-up procedure. Data/content thus lies stored in a memory at the connection points between the buses and the modules of the system. An ordinary start-up operation during the initiation stage can take place by utilising CANcommunication control units of the Intel or Philips type and can be completed by the microprocessor of the module also reading out the memory which is placed at the connection point/flexible lead connector where it receives information regarding at least its identification number in the system. This is required if the module is to receive information regarding which messages it is to receive or transmit by means of another start-up stage of the operating stage of the system itself. By replacement or completion with a microprocessor in the connection itself, the initiation stage can be considerably extended as far as the facilities are concerned. Seen overall, all information which is required for the physical execution of the communication can be transmitted from the master unit, for example "baud rate", "synchronisation jump width", "bus timing" etc, according to the CAN description from the manufacturers of the communication circuits in question. In such a manner, the modules can be manufactured in large series with identical hardware irrespective of whether they subsequently come to be built into systems in which, for example, optical signal transmission or electrical signal transmission has been selected, whether the modules are to be electrically isolated or not, whether a higher or a lower transmission speed is required, which method has been selected for electrical isolation, which of all variations is possible in the setting of the CAN communication unit and so forth. It is also to be noted that in most cases it is not even necessary to adapt the software in the modules in delivery or before connecting up.

The problem which is to be solved is inter alia that a module which is to be connected to a communication network must know to given degrees how the latter looks and functions. This can be solved in two manners, either by means of establishing a standard and subsequently using the same method for all installations, or by knowledge being received of the function on connection to the communication line and the connected module adapting its functions to this. The invention can envisage a method of obtaining this information directly on connection to the communication line. Alternative methods which can be found are that there is a keyboard on the module, in which necessary data can be keyed in, or that the unit is programmed before it is connected to the line. Since the information is necessary in order that communication be possible, a description is given here of how this can be obtained directly on connection to the line which requires that this information is available.

The information which is necessary first and foremost is the baud rate and other information which is associated with the bit rate on the line. It can also be necessary to have information regarding the line type and the line length in order that transmission and reception take place in a correct manner. It is moreover important for the connected module to know its position and task in the communication system so that it receives and transmits correct information and that it carries out the correct tasks. This information can be comprehensive in order to describe also how the higher-level system functions, how contact is to be established and to given degrees the function of the module at this connection point. All this data is of such a nature that it is necessary only when a module is physically connected to the communication line. An advantage of this is that a module can be placed in a number of different places without any change needing to be made in the hardware or software of the module. When the module, by means of the information which is received on connection, has made contact with the higher-level system, all or further information regarding the function can be received.

The information which must be received on connection can be of different kinds and contain different data quantities depending on which information is necessary in order to start communication in a correct manner. The most important task is that the module is identified in the system so that-the information following comes to the right module. If frequencies and the communication line are not standardised, information regarding this must also be received in order that the transmitted information following be interpreted in a correct manner. If the transmission of data takes place in a standardised manner subsequently, there are fewer problems but if this can take place in a number of different ways, this information must also be received on connection so that the information which in itself has been transmitted correctly is used in a correct manner.

Depending on which data quantities are required, the solutions will of course vary. The simplest solution is to use a simple shift register, for example the circuit 74LS166, in which data can be applied using ones and zeros connected to the 8 digital inputs. By means of three signals from the module out to the T-coupler and its circuit, these eight inputs can be read serially into the module. Expediently, a reset signal is used in order to latch the eight inputs to the shift register. By means of a clock output to the. T-coupler, the 8 bit values can subsequently be read in one by one serially. By series-connecting a number of circuits of the type 74LS166, further bits can be read in the same manner. This method is effective when there is little information to be obtained, for example identification of the placing of a module (address). With greater quantities of information, it is expedient to have a circuit function which can contain the information in a more compact manner. An expedient medium is a serial EEPROM which can be programmed and read a large number of times. These are available in different types, for example ER59256, NMC9346N and Xicor's 24C02 and so forth with similar methods for reading out and writing. Since this memory, 7 and 8 in FIGS. 2 and 3, can be reprogrammed, correct information can be written in when the place of the T-coupler in the system is defined and this T-coupler can still be used in another place after a reprogramming. For reading out a memory of the type 24C02 from Xicor, there are required two signal lines, a clock line for indication of reading and writing, SCLOCK in FIG. 2, and a two-way data line for reading and writing, SDATA in FIG. 2, for the memory. In certain cases, there may be required two data lines, one for reading and one for writing, and/or lines for selection of memory circuits. In order that the invention have the general function which is desired, it is necessary that this serial reading out can take place in a clear manner with regard to the number of lines and how the information is to be produced via these lines.

The most advanced method of solving the information transmission is that there is in the T-coupler a microprocessor or other advanced logic function. With the aid of this, the information can be stored in an arbitrary manner. When the information is to be transmitted to the module, the T-coupler can adapt the transmission to the module so that it comes in a manner which is desirable for this module. With this structure, it can also be possible to move parts of the information up to a central 10 memory. The start-up takes place in two stages. First, the T-coupler disconnects the module from the communication line and connects itself to this. By making use of the communication line or any other line parallel to this, for example the emergency stop/reset line, the T-coupler can establish an association with the central unit. Via this contact, the T-coupler can bring down all the information which is necessary for the communication of the module. When this information transmission is complete, the T-couplers can be disconnected from communication and instead they transmit the information to the module which is instead connected to the communication line. In this case, the T-coupler becomes an intelligent adapter between the modules and the communication to the central system (the master).

Figure 4:
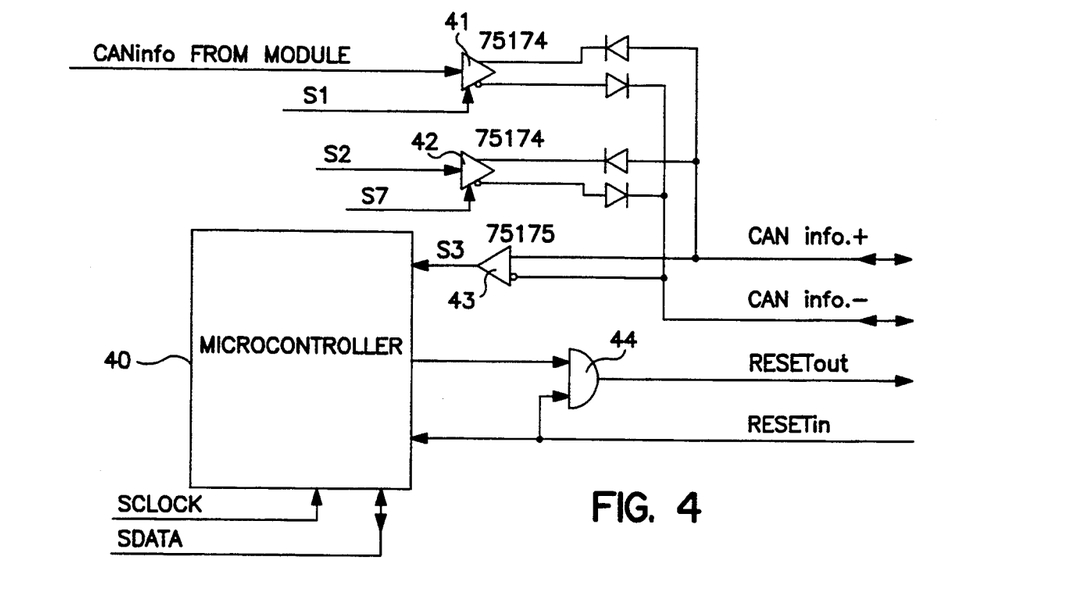
FIG. 4 shows in diagrammatic form a connecting device with built-in microprocessor instead of a memory member according to FIGS. 1–3.

FIG. 4 describes a set-up which can be used for a good utilisation of the microprocessor in the module. This set-up is a development of the electronics which are described in FIG. 2 and the unit 9 in FIG. 2 corresponds to 41 in FIG. 4. In the drawing, only the connecting up of the CANinfo bus is described. If the same setting is to be made for CANsync, a doubling of all signals S1–S6 is required and of further components corresponding to 41–44 for connection the CANsync bus. The increase of the signal corresponding to S1 is then in order to disconnect the other part at 9 in FIG. 2 so that the module cannot transmit on the CANsync bus. The function presupposes that the signal S5 "Resetin" comes from the module closest to the master box 4 in FIG. 1 and that S6 goes to the next T-box along the communication line. On start-up, all T-boxes place the signal S4 on low in order thus to receive low on the signal S6 to the following module. The signal S1 is also set low in order thus to disconnect the transmitter circuit 51. Now all modules are disconnected from the communication line and all units receive low level on the signal S5 in to the T-box. The master box has no preceding box, for which reason its signal S5 is connected to the micro- processor in the master box. By virtue of the fact that the microprocessor in the master box 4 sets both the signals S5 and S4 high, S6 also will be high. This signal S6 from the master box corresponds to S5 in the following T-box 5 which will then go high. This indicates to the microprocessor 40 in the T-box that the master will now transmit information to this module. The microprocessor then puts the signal S7 high in order to make possible both transmission and reception on the CANinfo communication bus. At this stage, it is only the master box 4 and the T-box 5 which are permitted to communicate on this bus. The T-box is the only one which communicates with the master since it is the only one which has the signal S5 high. The master can then transmit information to the T-box provided that the communication via the bus takes place according to a predetermined protocol between the T-box and the master. An advantage of this method is that the T-box can also receive the address via the communication, since in this stage it is the only one which is connected to the communication to the master. When all information is transmitted, or at least the address, to this T-box, it is to disconnect itself from listening for this first message and puts the signal S4 high. This will cause the signal S5 at the next module to go high and an initiation of address and possibly other information can take place at this T-box. Since the T-box 5 is already initiated, it knows that it cannot read in this information regarding address but stays at the address already given. This continues through the whole communication until all units have received information regarding address in the communication and possibly other information important for the communication. When all T-boxes have received an address, further necessary information can subsequently be transmitted to the T-boxes. When everything for the communication is done, all T-boxes can disconnect themselves from the communication by disconnecting 42 by putting the signal S7 low. By means of the signals SDATA and SCLOCK, the microprocessor 40 can then transmit the information to the module. When this is done, 40 puts the signal S1 high so that the module is instead connected into the communication line and subsequently the communication takes place directly between the master and the module.

By virtue of the fact that the last T-box in the bus connects its signal S6 in return back to the master box, it can check that all T-boxes have been initiated. If a fault occurs in a T-box, this can be indicated by the faulty unit putting its signal S4 low, whereupon all units following thereafter receive low on S5 and S6. When the master box indicates this can in the whole system and a reinitiation can be done. If a fault occurs during the start-up, the master can, by putting S5 low, carry out a reset of all T-boxes and subsequently restart the whole from the beginning.

If all T-boxes have an address already given on start-up, the conductors S4 and S6 of course disappear and the component 44 and the whole is simplified to the extent that the microprocessors 40 of all T-boxes disconnect their modules from the communication by putting S1 low and connect themselves in by putting the signal S7 high. When all T-boxes have an unambiguous address, information can thereafter be transmitted from the master to each T-box directly. When all information necessary for the T-box is transmitted, the latter can in turn transmit information to the connected module via SDATA and SCLOCK.

The information transmission to the T-box can be effected at another rate than that which is used by the module for the actual communication. Expediently, the rate is adapted, for example to a low level 10–100 kbit, on initiation, so that most distances, electrical couplings and line types can be managed. When all settings are ready, and the actual communication is to start, all modules and master of course use a new transmission rate which is optimum for precisely this system.

In FIG. 4, no optocoupler has been drawn. If this is necessary, it must be introduced on the signals SDATA and SCLOCK or on the signal S1 to S7. The item in FIG. 4 marked by 40 consists of a microcontroller with accessories. This unit can in the CAN case described consist of a circuit of the type PCB80C552 with CAN-controller with peripheral circuits necessary for its operation, such as oscillator and voltage supply. In cases in which the master unit 1 wishes to control the start-up stage, further signals are required between 1 and 4 than what is indicated in FIG. 4. Possibly the entire operation of the unit 40 is left in the master unit 1 in order to obtain full control. The diodes in FIGS. 2, 3 and 4 are in order that driving of the bus only takes place when a dominant level is transmitted on the CAN bus. How these are turned depends on which level is defined as dominant. The same definition must nevertheless apply for the whole communication line. In cases in which a standardised start-up stage is not desirable or possible, the memory of the T-coupler can contain the information which is necessary in order that the module in the operating stage will transmit its message with correct identification so that this corresponds to the modules which are to receive this transmitted information.

All, or one or more, of these functions which are placed in the T-box can of course be placed internally in the module but then the flexibility is lost to choose freely the communication line and the transmission rate on this. By putting said function(s) in the T-coupler, the system builder can achieve the degree of complexity he prefers. The modules need only to be adapted to their software for the start-up stage. This is not time-critical in relation to the operating stage. The modules can thus be made more flexible and in larger series with identical hardware execution. It is in practice possible for the microprocessor in the T-coupler to communicate simultaneously with the module provided that they have different addresses in the communication. The reset signal can of course also be used in order to emergency stop the system during operation and thus replace the signal RESET in FIG. 2.

The invention is not limited to the embodiment shown by way of example above but can be subjected to modifications within the scope of the following patent claims and the inventive idea.

I claim:

1. A distributed computer system comprising:

a serial data bus;

a plurality of module units for performing logical operations at a plurality of locations;

a plurality of connecting devices, each connecting device connecting a respective module unit to said serial data bus, each connecting device including:

a memory device storing information which is unique to a respective connected module unit for enabling said module unit to communicate over said bus, including identification information to identify said module unit to other module units; and, logic means connected to said memory device for transferring said information to said respective module unit during an initiation phase of said system, whereby said module unit is enabled to communicate over said data bus.

2. The distributed computer system according to claim 1, wherein said connecting device supplies said information to said serial bus or said module unit upon receipt of a command from one of said serial bus or module unit.

3. The distributed computer system according to claim 2, wherein said microprocessor is programmed to transmit reset messages or emergency stop messages to one or more of said module units over said serial bus.

4. The distributed computer system of claim 2, wherein said bus transfers to said module units position information for said module unit, and information relating to the bus message protocol for permitting said module unit to communicate over said bus.

5. The distributed computer system according to claim 1, wherein said logic means comprises a microprocessor which communicates over said bus with one of said module units under a protocol common to all of said module units.

6. The distributed computer system of claim 1, wherein each connecting device has first and second sets of connectors for mating with corresponding connectors of said serial bus and module units.

7. The distributed computer system according to claim 6, wherein said first set of connectors provides connections which are to supply power to said connection device to implement a reset function or an emergency function, and to implement a module identification function for identifying a connected module.

8. The distributed computer system according to claim 1 comprising a parallel processor operating system which transfers messages between a module unit serving as a master unit and a module unit serving as a slave unit in accordance with an established priority.

9. The distributed system according to claim 1, wherein each module unit checks each message transferred over said bus to determine whether a respective module unit is the destination for said message based upon said information received from said memory device, and said module unit includes means for sending an acknowledgement message over said bus when it receives a message for which it is the destination.

10. A distributed computer system of claim 1, wherein said bus includes at least two connections to said connecting devices, the first of said bus connections carrying messages of a first class of information and said second of said bus connections providing a second class of information.

* * * * *